United States Patent [19]
Yamakawa et al.

[11] Patent Number: 5,682,372
[45] Date of Patent: Oct. 28, 1997

[54] METHOD AND APPARATUS FOR PLAYING BACK MULTILAYER DISK

[75] Inventors: Akio Yamakawa, Kanagawa; Tetsuo Usui, Tokyo; Masamichi Utsumi, Chiba, all of Japan

[73] Assignee: Sony Corporation, Tokyo, Japan

[21] Appl. No.: 698,309

[22] Filed: Aug. 15, 1996

[30] Foreign Application Priority Data

Aug. 22, 1995 [JP] Japan .................................. 7-234648

[51] Int. Cl.⁶ ...................................................... G11B 7/00
[52] U.S. Cl. ........................ 369/94; 369/112; 369/44.25
[58] Field of Search ................................ 369/124, 44.25, 369/44.42, 44.41, 32, 112, 94

[56] References Cited

U.S. PATENT DOCUMENTS 4,716,283 12/1987 Ando ........................................ 369/112

*Primary Examiner*—Nabil Hindi
*Attorney, Agent, or Firm*—Ronald P. Kananen

[57] ABSTRACT

There is disclosed a method of playing back information from an optical multilayer disk having a plurality of recording disks stacked on top of each other, by the use of an optical pickup device. In order to switch the focused recording layer from a first one to a second one so that data is read from the second recording layer, the focus balanced condition of the pickup device is switched from a setting providing a focus error characteristic adapted for the first recording layer to a reference setting providing a neutral focus error characteristic. Then, the focal point of the pickup device is moved from the first recording layer. Subsequently, the pickup device is focused onto the second recording layer, and data is read from the second recording layer. Thereafter, the focus balanced condition of the pickup device is switched to a setting adapted to the second recording layer.

13 Claims, 6 Drawing Sheets laser light

METHOD AND APPARATUS FOR PLAYING BACK MULTILAYER DISK

The present invention relates to a method for causing the focus of laser light to jump from one of a plurality of laminated recording layers of a multilayer disk to a different one and for playing back data recorded in the different layer. The invention also relates to a playback apparatus used for the method.

The manner in which a playback apparatus for reading data from an optical multilayer disk directs a light beam at the disk is schematically shown in FIG. 1.

In this figure, a multilayer disk 1 has three recording layers, for example. This disk has a first recording layer 3, a second recording layer 4, and a third recording layer 5. Protective layers 2 and 6 are formed on the front side of the first recording layer 3 and on the rear side of the third recording layer 5, respectively.

In the illustrated example, laser light is focused by an objective lens 7 incorporated in an optical pickup device (not shown). The laser light is transmitted through the transparent protective layer 2 and focused onto the second recording layer 4. Under this condition, data can be read from the second recording layer 4.

In this case, the laser light focused by the objective lens is reflected by the second recording layer 4. The reflected light travels toward the objective lens and is returned to the pickup device, where the reflected light is received. In this way, data recorded on the recording layer 4 is read out. One example of construction of such playback apparatus is shown in FIG. 2.

In FIG. 2, laser light reflected by the multilayer disk 1 is received by a detector 11, which is divided into four parts, or 11A, 11B, 11C, and 11D. The light is received by the detector parts 11A and 11C, which are disposed diagonally. The light is converted into electrical signals which are then summed up by an adder 12. The resulting sum signal (A+C) is amplified by a preamplifier 13 and applied to a subtracter 16 and also to adders 20, 25. The light is also received by the detector parts 11B and 11D which are arranged diagonally, and converted into electrical signals. These electrical signals are summed up by another adder 14. The resulting sum signal (B+D) is amplified by another preamplifier 15 and applied to the subtracter 16 and also to the adders 20, 25.

The subtracter 16 produces an output signal c, or a focus error signal {(A+C)−(B+D)}, which is then equalized by a phase-compensating circuit 17 and applied to one terminal of a switch 18. A focus search drive voltage signal having a given characteristic is supplied from a focus search driver circuit 19 to the other terminal of the switch 18. Either signal selected by the switch 18 is supplied via a driver amplifier 28 to a focus driver coil 29 to drive it. In this way, an objective lens mounted inside the optical pickup device is moved relative to the optical disk 1.

In this case, if the result of a detection is that the optical disk 1 is in focus, then the switch 18 produces the focus error signal {(A+C)−(B+D)}. If the result of the detection is that the optical disk 1 is not in focus, then the focus search drive voltage signal is produced.

In the initial state created by turning on the power supply or the like, the focus search drive voltage signal is produced from the switch 18.

The adder 20 creates an output signal a, or playback RF signal (A+B+C+D), which is applied to one terminal of a comparator 21. This signal is compared with a reference voltage V1 applied to the other terminal of the comparator 21. That is, in the comparator 21, the playback RF signal (A+B+C+D) is compared with the reference voltage V1. When the level of the RF signal is in excess of the reference voltage V1, the disk is regarded as being in focus, and the comparator 21 delivers a focus OK signal (signal b) of H level. This focus OK signal turns on a switch 23.

When the level of the playback RF signal (A+B+C+D) is less than the reference voltage V1, the disk is regarded as being out of focus, and the comparator 21 produces a signal of L level. This signal turns off the switch 23.

The focus error signal {(A+C)−(B+D)} delivered from the subtracter 16 is compared with a reference voltage V2 of zero potential by a comparator 22. The comparator 22 produces a zero-crossing detection signal which is produced when the focus error signal {(A+C)−(B+D)} crosses the zero point. When the focus OK signal is being produced, the zero-crossing detection signal passes through the switch 23 and is applied as a signal d to a central processing unit (CPU) 24. The CPU 24 senses that the disk is just in focus by detecting the trailing edge of the zero-crossing detection signal.

The adder 25 creates the playback RF signal (A+B+C+D) which is supplied to a data decoder 27 via an RF preamplifier 26. Data read from the optical disk 1 is decoded by the data decoder 27 and supplied to the CPU 24.

The CPU 24 senses how many recording layers in the optical disk 1 by referring to the subcode R included in subcodes in the supplied data. The CPU 24 also senses which recording layer is the presently read recording layer by referring to layer data recorded in the subcode S included in the subcodes.

At this time, the CPU 24 detects the trailing edge of the zero-crossing detection signal applied via the switch 23. The CPU produces a focus ON signal e indicating that the disk is in focus at that timing. This focus ON signal e controls the switch 18 in the manner described above.

That is, the CPU 24 is designed so that it receives the subcodes and the focus error signal {(A+C)−(B+D)} from the data decoder 27 and can sense whether the desired recording layer is in focus or not.

FIG. 3 is a waveform diagram illustrating the operation of the playback apparatus shown in FIG. 2. The operation of the playback apparatus is now described by referring to FIG. 3. Signal waveforms a-e shown in this figure correspond to signals a-e, respectively, shown in FIG. 2.

We now describe a case in which the light is to be focused onto the second recording layer of the optical disk 1 consisting of the three recording layers. The playback apparatus first detects the number of recording layers of the optical disk 1. Then, data for making a jump to the second recording layer is set.

It is assumed that a search is started at timing H. The focus driver coil 29 is driven with the focus search drive voltage signal. The objective lens 7 mounted in the optical pickup device is moved. If the optical disk 1 is gradually brought to a focus, the playback RF signal a produced from the adder 20 exceeds the reference voltage V1. The comparator 21 produces the focus OK signal b of H level, as shown. This turns on the switch 23, permitting the output from the comparator 22 to be fed to the CPU 24. The focus error signal c is compared with the reference voltage V2 which is at zero potential, by the comparator 22. The comparator 22 produces the zero-crossing detection signal d, and this signal is applied to the CPU 24.

The focus error voltage characteristic shown as the signal c is depicted in FIG. 4. The distance traveled by the focus from the optical focal point is plotted on the horizontal axis. The error voltage is plotted on the vertical axis. As shown, the focus error voltage characteristic changes like the letter S. A focus servo operation which is a feedback control is carried out by making use of the straight range in the center of the characteristic. When the error voltage decreases down to zero, an optical focused condition is accomplished. To detect this focused condition, the CPU 24 detects the trailing edge of the zero-crossing detection signal d. That is, if the trailing edge of the zero-crossing detection signal d is detected, the CPU 24 judges that a focused condition has been attained. Then, the CPU 24 produces the focus ON signal e. The switch 18 passes the output from the phase-compensating circuit 17 under the control of the focus ON signal e.

As a result, focus servo is started to be applied at timing I, for example. The apparatus is so controlled that the presently focused recording layer is maintained in focus.

By this focus servo control, the first recording layer is focused. Subcodes recorded in the first recording layer are read out, decoded by the data decoder 27, and supplied to the CPU 24. Data used to make a jump to the second recording layer is fetched from the subcodes and read into the CPU 24 which refers to data about the number of layers in the optical disk 1. Data is to be read from this second recording layer. The focus ON signal is made to go low (L) at timing J. At this time, a search of the second recording layer for data is started.

That is, the focus search drive voltage signal from the focus search driver circuit 19 is supplied to the focus driver coil 29 to move the objective lens 7 in the optical pickup. Thus, a search is made.

As this objective lens 7 moves, the focus error signal c changes as shown in FIG. 3 according to the error voltage characteristic shown in FIG. 4. At moment K, the second trailing edge of the zero-crossing detection signal of the focus error signal is detected. At this time, the result of detection is that the optical pickup device is focused onto the second recording layer.

In particular, the focus ON signal e from the CPU 24 is fed to the switch 18. The focus error signal c from the phase-compensating circuit 17 drives the focus driver coil 29 via the driver amplifier 28. This causes the focus servo to apply to the second recording layer. Hence, data recorded on the second recording layer is read out.

In the above-described focus servo technique, the focus servo is applied generally at a point where the amplitude of the playback RF signal assumes a maximum value or the jitter of the playback RF signal is set to a minimum value.

However, when the focus servo is set in this way, the focus servo is not applied in such a way that the focus balanced point agrees with the optical focus balanced point as shown in FIG. 4. Rather, the focus servo is generally applied in such a manner that the point agrees either with a focus balanced point R1 (as shown in FIG. 5) or R2 deviating from the optical focus balanced point.

The main cause of the above-described deviation of the focus balanced point is optical aberration. Offset of the focus servo is a minor cause. This optical aberration differs among different optical disks or different recording layers. As a consequence, the focus balanced point at which optimal reading is done differs among optical disks or recording layers.

In this case, the peak height value measured from the focus balanced point at which the S-shaped error voltage characteristic is read optimally to a positive peak P1 is different from the peak height value measured from the focus balanced point at which optimum reading is done to a negative peak P2.

When the focus servo is applied in such a manner that the point is the focus balanced point R1 or R2 deviating from the optical focus balanced point in this way, reading from the optical disk 1 is done well. However, we have found that if a focus jump from one recording layer to another for switching the recording layer being read is attempted, the focus servo to the next recording layer gets easily out of order.

SUMMARY OF THE INVENTION

Accordingly, it is an object of the present invention to provide a method and apparatus for playing back data from an optical multilayer disk, the method and apparatus being characterized in that a focus jump from one recording layer to another is permitted but focus servo to the next recording layer can be stably applied after the focus jump.

DETAILED DESCRIPTION OF THE INVENTION

Figure 6:
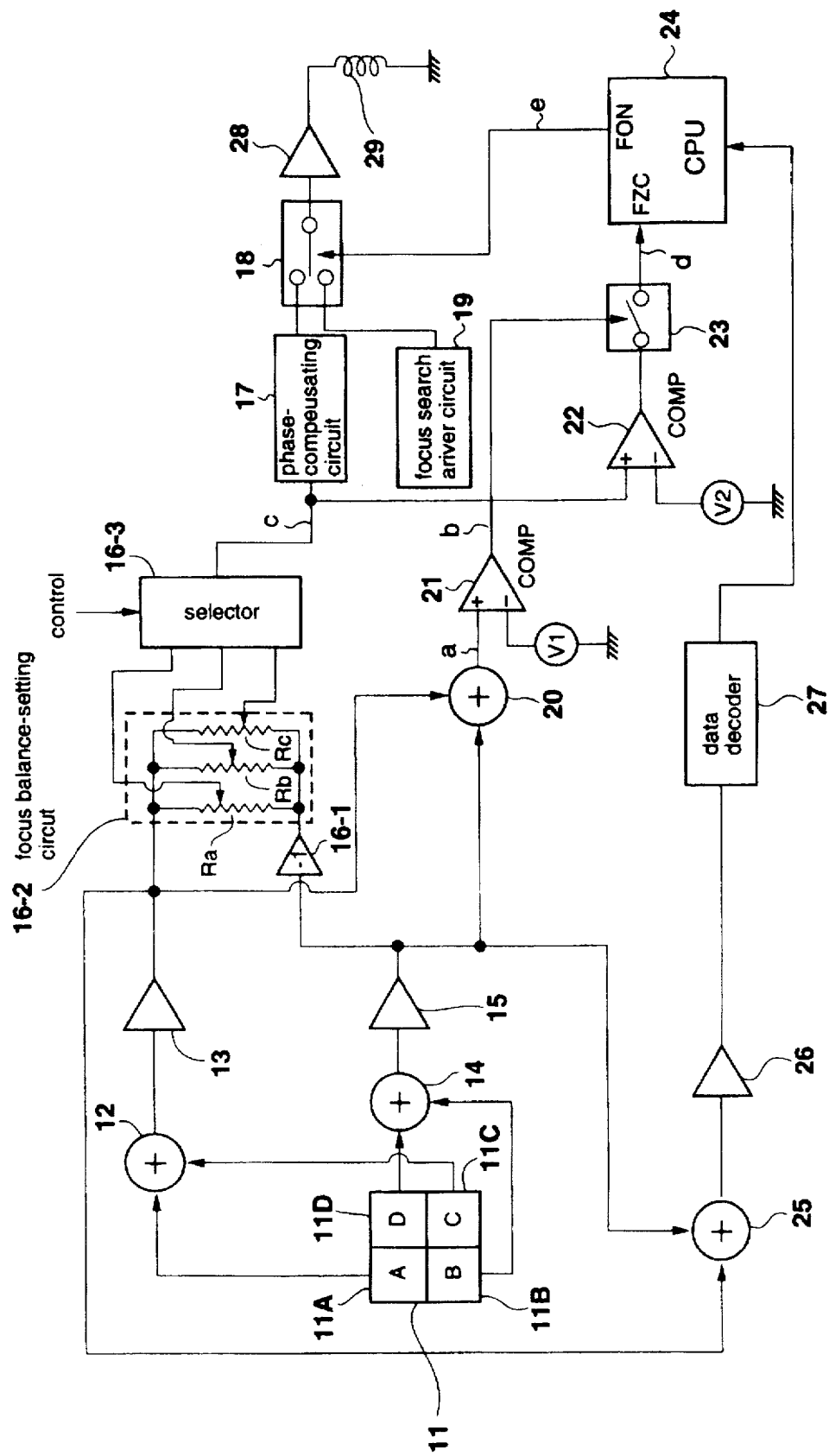
FIG. 6 is a block diagram showing one embodiment of an apparatus for playing back a multilayer disk, the apparatus embodying a method of playing back the multilayer disk in accordance with the present invention.

FIG. 6 is a block diagram showing the configuration of one embodiment of an apparatus according to the invention in which the apparatus is designed to play back an optical multilayer disk. The apparatus embodies a method of playing back the optical multilayer disk in accordance with the invention.

In this figure, a detector 11 receives laser light reflected by an optical disk 1 having a plurality of recording layers and converts it into an electrical signal. The detector 11 is divided into four parts 11A–11D. To facilitate understanding, it is assumed in the present embodiment that the optical disk to be played back has two recording layers. The output signals from the detector parts 11A and 11C produced in response to received light are summed up by an adder 12 and amplified by a preamplifier 13. The signal is then fed to one input terminal of a focus balance-setting circuit 16-2. The output signals from the detector parts 11B and 11D in response to received light are summed up by another adder 14 and amplified by another preamplifier 15. Then, the signal is inverted in sign by an inverter 16-1 and applied to the other input terminal of the focus balance-setting circuit 16-2. In this way, the focus balance-setting circuit 16-2 creates a focus error voltage {(A+C)−(B+D)} which is the difference between the output signal (A+C) from the preamplifier 13 and the output signal (B+D) from the preamplifier 15.

The focus balance-setting circuit 16-2 is a circuit for adjusting the focus error voltage so that optimum reading from the optical disk 1 can be done. This circuit comprises means for setting focus balancing voltages corresponding to the recording layers of the optical disk 1 and producing the set voltages, together with a means for producing a reference focus balancing voltage whose error voltage characteristics are in a neutral state. In the configuration shown in FIG. 6, the means for producing a focus balancing voltage to the first recording layer of the optical disk 1 is a variable resistor Ra, for example. The means for producing a focus balancing voltage to the second recording layer is a variable resistor Rc. The means for producing the reference focus balancing voltage whose error voltage characteristics are in a neutral state is a variable resistor Rb.

Plural focus error voltages produced by the focus balance-setting circuit 16-2 are applied to a selector 16-3. Any one of the focus error signals {(1−K) (A+C)−(1+K) (B+D)} (signal c) is selected and delivered. This coefficient K is set by the focus balance-setting circuit 16-2. An optimum coefficient K is preset for the recording layer. Alternatively, the coefficient K is automatically set so that the amplitude of the RF playback signal is increased to its maximum value or that the jitter is reduced to a minimum. The output from the selector 16-3 is equalized by a phase-compensating circuit 17 and applied to one terminal of a switch 18. The switch 18 passes a focus drive voltage produced either from the phase-compensating circuit 17 or from the focus search driver circuit 19. The output voltage from the switch is power-amplified by the driver amplifier 28 and supplied to the focus driver coil 29, thus driving it. As a result, the objective lens (not shown) is moved in the direction of the optical axis so that the light is focused onto the desired layer on the optical disk 1.

In the adder 20, the output from the preamplifier 13 and the output from the preamplifier 15 are summed up to create a playback RF signal (A+B+C+D) (signal a). This signal a is compared with a reference voltage V1 in a comparator 21. When the level of the signal a exceeds the reference voltage V1, the output signal b goes high (H). A focus OK signal turns on the switch 23 which receives a zero-crossing detection signal from a comparator 22 that compares a focus error voltage {(1−K) (A+C)−(1+K) (B+D)} with a reference voltage V2 of zero potential, the focus error voltage being delivered from the selector 16-3. When the focus OK signal is fed to the switch 23, the zero-crossing detection signal d from the comparator 22 is fed to the CPU 24. The CPU 24 detects the trailing edge of the zero-crossing detection signal d.

The adder 25 produces the sum of the output from the preamplifier 13 and the output from the preamplifier 15 to create the playback RF signal (A+B+C+D). This playback RF signal is amplified by an RF preamplifier 26 and then decoded by a decoder 27. The decoded signal contains subcodes P-W which can contain information other than main information in the optical disk 1. Decoded subcodes are supplied to the CPU 24. The CPU 24 reads data about the number of recording layers on the optical disk 1, for example, from the subcode R of the subcodes read from the optical disk 1. At the same time, the CPU 24 reads data indicating the number given to the recording layer which is presently being read, for example, from the subcode S of the subcodes.

When the CPU 24 senses from the applied zero-crossing detection signal d that the optical disk 1 is in focus, a focus ON signal e is fed to the switch 18. The switch 18 passes the output signal from the phase-compensating circuit 17.

Figure 1:
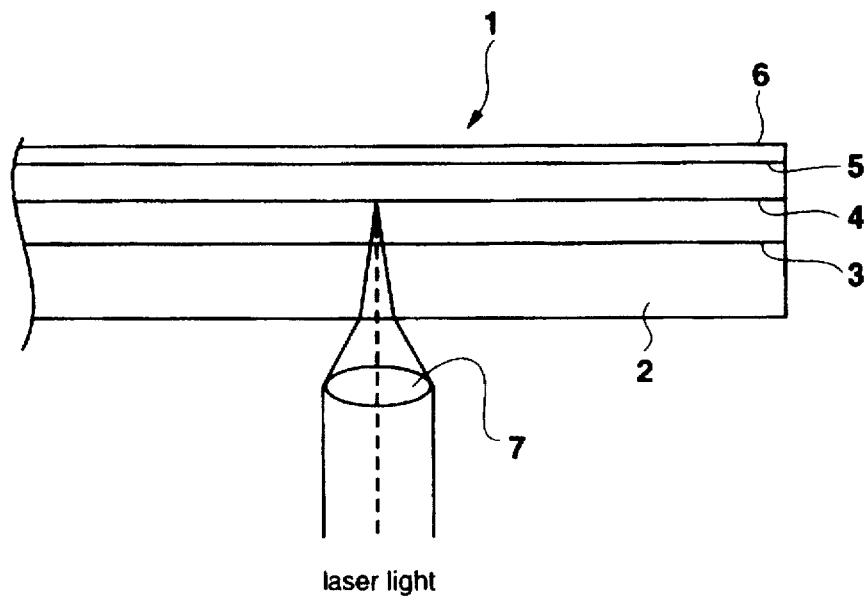
FIG. 1 is a view showing the relation between an optical disk and an optical pickup device for use in a method according to the invention.
Figure 4:
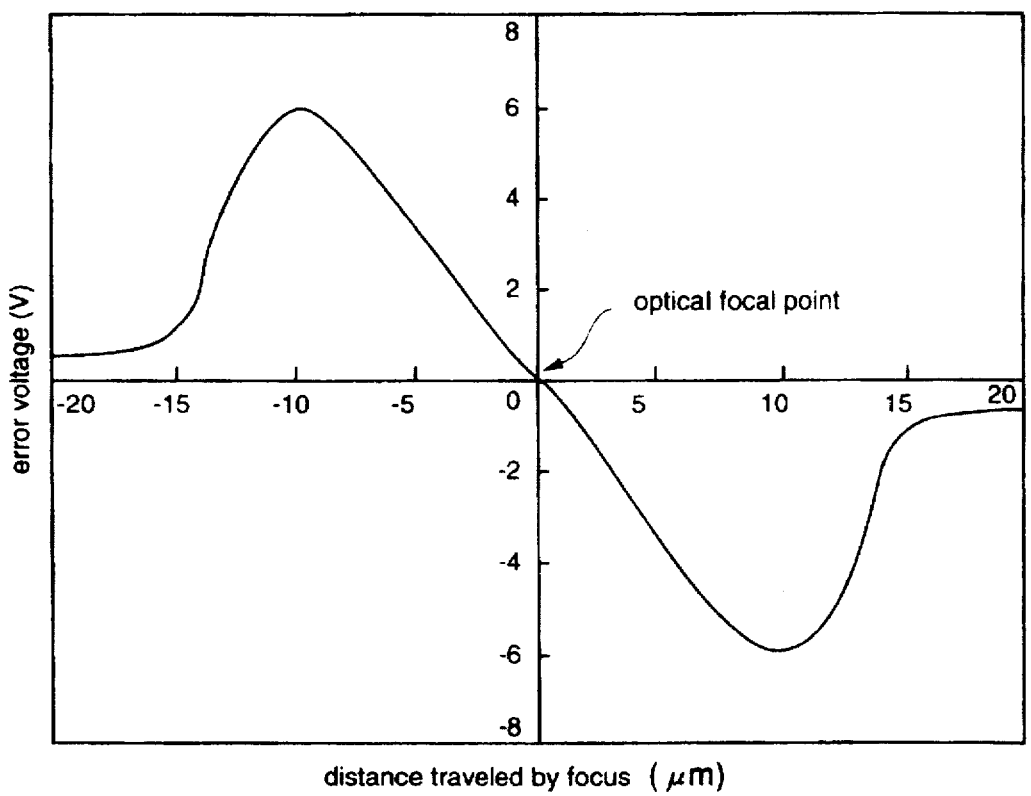
FIG. 4 is a diagram showing a focus error voltage characteristic having an optical focus balanced point.
Figure 2:
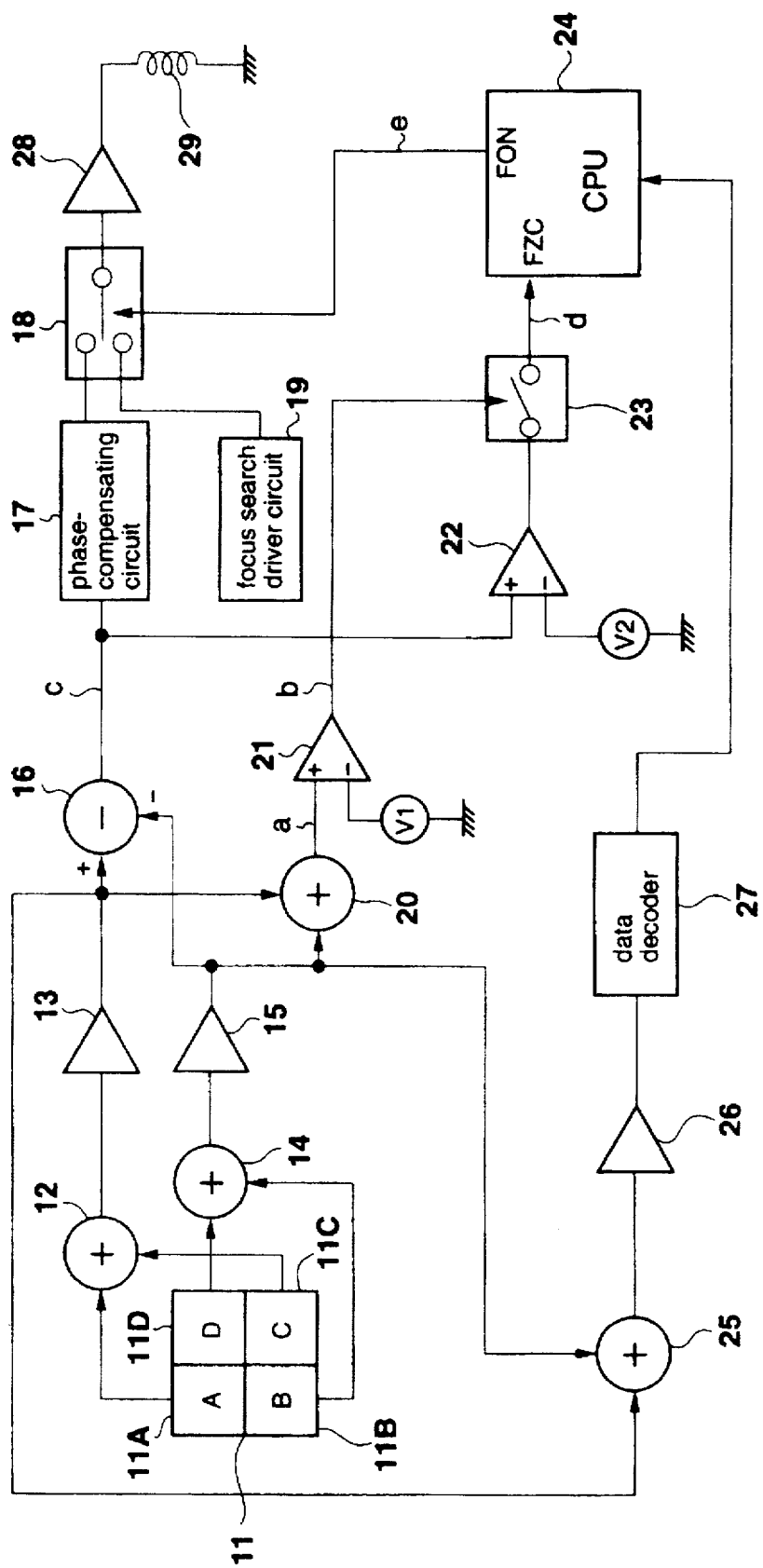
FIG. 2 is a block diagram showing one example of the construction of the prior art multilayer disk playback apparatus.
Figure 3:
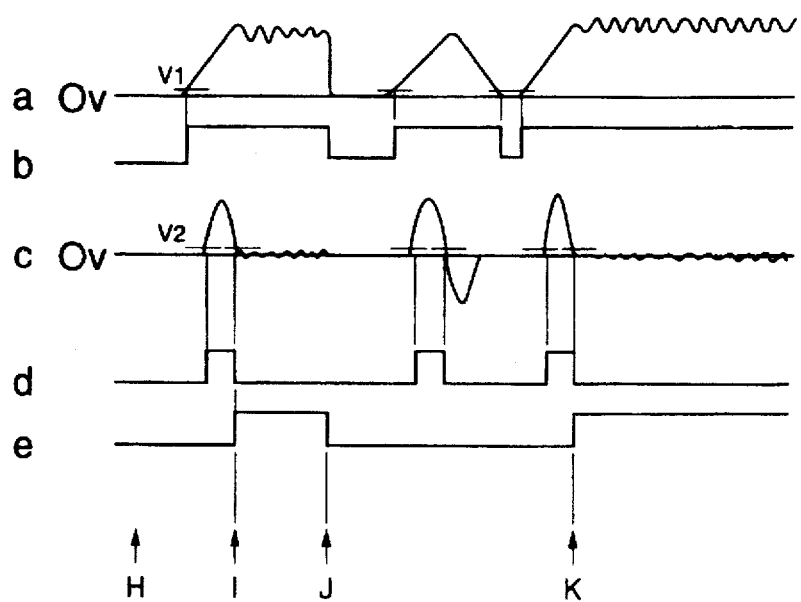
FIG. 3 is a waveform diagram illustrating the operation of the prior art multilayer disk playback apparatus shown in FIG. 2.
Figure 5:
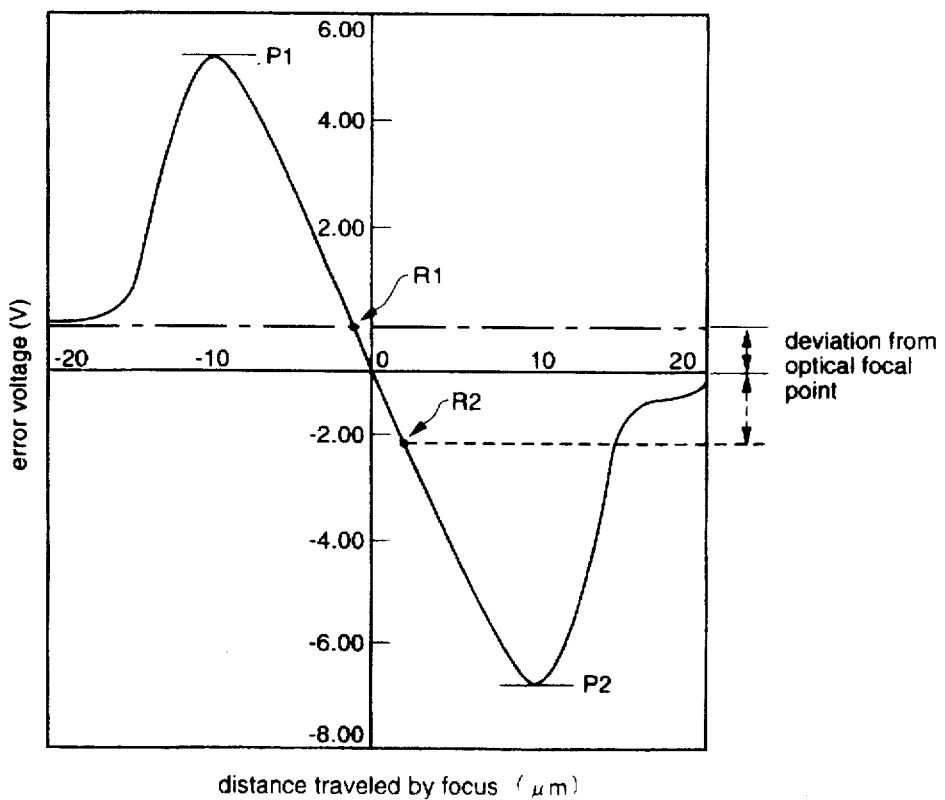
FIG. 5 is a diagram of a focus error voltage characteristic, illustrating a focus balancing voltage in the prior art multilayer disk playback apparatus.

Then, the operation of the multilayer disk playback apparatus shown in FIG. 6 is described by referring to the above-described waveform diagram of FIG. 3. It is assumed that in the initial state established by turning on the power supply or the like, the switch 18 is connected to the focus search driver circuit 19 and the output from the variable resistor Ra for the first recording layer is selected by the selector 16-3.

Then, the focus driver coil 29 is driven according to the focus search drive signal produced from the driver amplifier 28, and the objective lens in the optical pickup is moved relative to the optical disk 1.

As this movement is made, the focus error voltage signal c is created, as shown in FIG. 3, from light reflected by the optical disk 1, the light being received by the detector 11. The error voltage signal is delivered from the selector 16-3. Zero-crossing of the focus error voltage signal c produced from the selector 16-3 is detected by the comparator 22.

The adder 20 creates the playback RF signal a from light reflected by the optical disk 1, the light being received by the detector 11. The playback RF signal a produced by the adder is compared with the reference voltage V1 by the comparator. When the level of the playback RF signal a exceeds V1, a high-level signal is produced as shown in FIG. 3. The high-level signal from the comparator 21 is the focus OK signal b, which turns on the switch 23.

Therefore, the zero-crossing detection signal d produced by the comparator 22 is fed to the CPU 24 via the switch 23. When the trailing edge of the zero-crossing detection signal d is detected, the CPU 24 judges that the optical disk 1 is brought to a focus, and produces the focus ON signal e. The switch 18 is thereby connected to the phase-compensating circuit 17, thus forming a feedback loop. As a result, focus the servo acts.

This makes it possible to read data from the first recording layer of the optical disk 1. If the laser light jumps from the first recording layer to another recording layer due to a scratch or the like during the reading of the data, the layer jump can be easily detected by reading data about the subcode S, for example, in the subcodes.

The operation performed when the focus is made to jump from the first recording layer to the second recording layer, for example, is next described. Characteristic operations of this case are briefly described by referring to FIG. 7.

Figure 7:
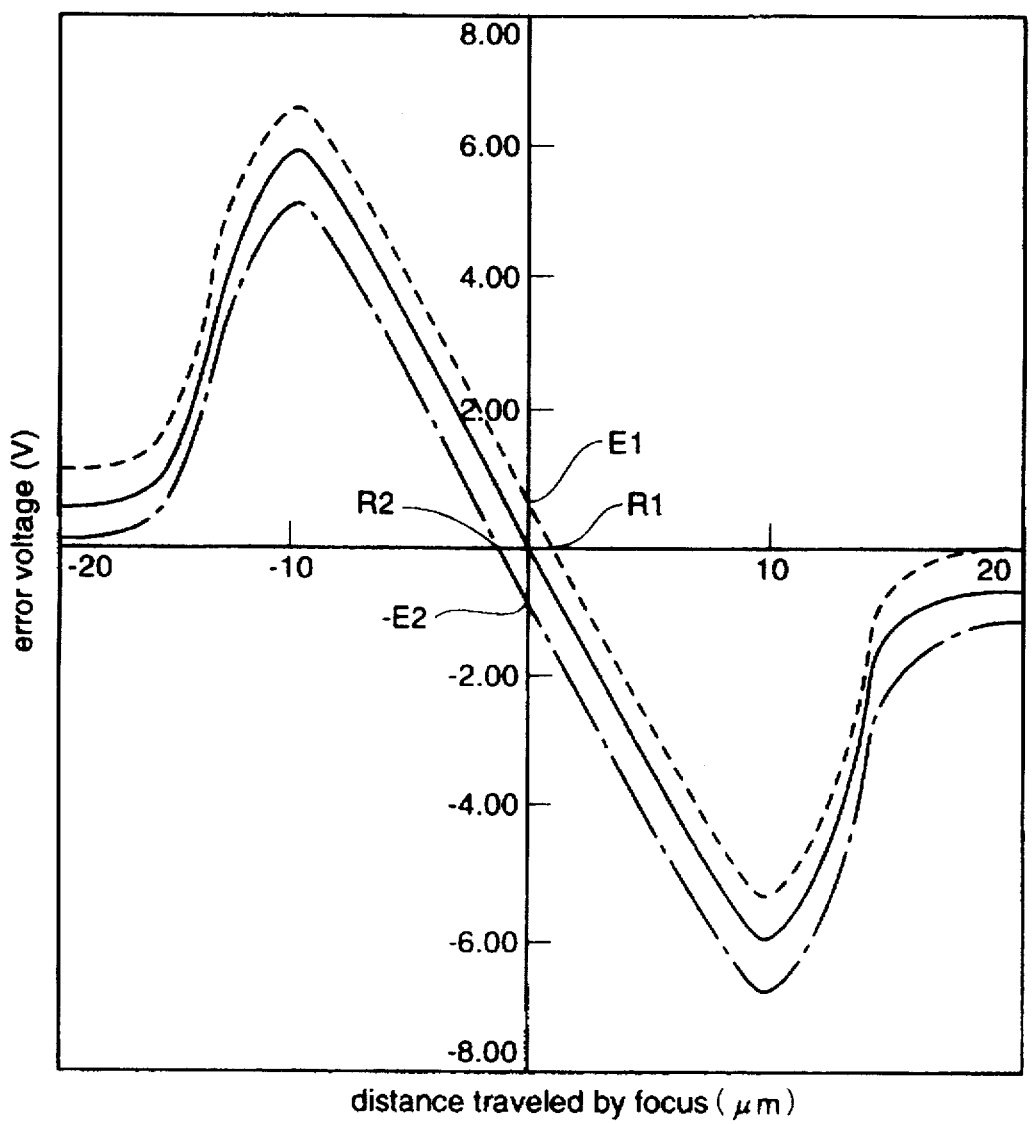
FIG. 7 is a diagram showing examples of focus error voltage characteristics, illustrating focus jump of a multilayer disk playback apparatus according to the invention.

FIG. 7 shows three focus error voltage characteristics. The focus error voltage characteristic indicated by the broken line is the focus error voltage characteristic concerning one layer of the optical disk 1 and corresponds to the first recording layer in this example. The focus error voltage characteristic indicated by the dot-and-dash line is the focus error voltage characteristic concerning another layer of the optical disk 1 and corresponds to the second recording layer in this example. The focus error voltage characteristic indicated by the solid line is the focus error voltage characteristic concerning a neutral state having an optical focus balanced point.

Optimum reading from the first recording layer can be done at focus balanced point R1. Optimum reading from the second recording layer can be done at focus balanced point R2. Therefore, the focus balance-setting circuit 16-2 adjusts the variable resistance Ra to vary the coefficient K. When an optically focused condition is accomplished, the circuit produces the focus error voltage which is a focus balancing voltage (E1). The circuit varies the variable resistance Rc to change the coefficient K. When an optically focused condition is accomplished, the circuit produces the focus error voltage which is a focus balancing voltage (E2).

Since the optimum focus balancing voltage differs among different recording layers in this way, the focus servo easily gets out of order after a jump of the focus as described above.

Accordingly, in the present invention, where the focus is made to jump from the first recording layer to the second recording layer, immediately before the execution of the jump, the focus error voltage characteristic is made to shift to the focus error voltage characteristic which is in a neutral state and has the optical focus balanced point indicated by the solid line in FIG. 7. Specifically, the selector 16-3 is so controlled that the neutral reference focus balancing voltage is produced, using the variable resistor Rb instead of the focus balancing voltage produced, using the variable resistor Ra best suited for the first recording layer. Then, the focus is made to jump to the second recording layer. Thereafter, the selector 16-3 is so controlled that the focus balancing voltage is produced, using the variable resistor Rc adapted for the second recording layer instead of the reference focus balancing voltage produced, using the variable resistor Rb.

Figure 8A:
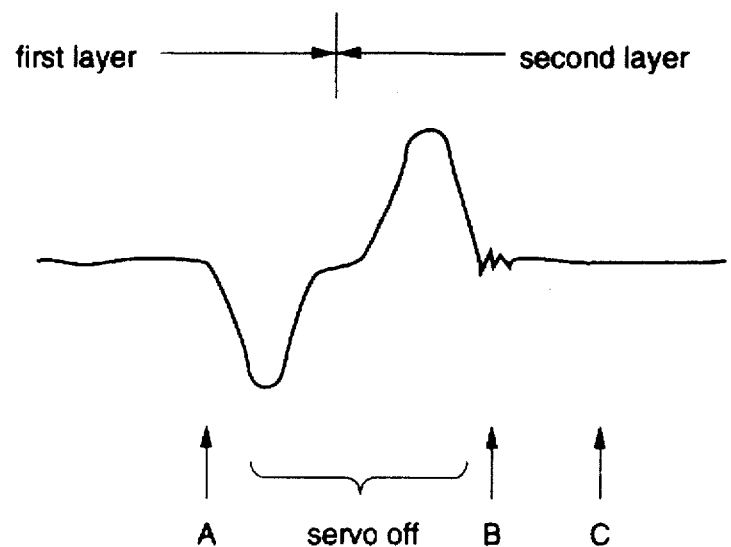
FIGS. 8A and 8B are waveform diagrams showing variations of a focus error voltage signal when a focus jump is made by a multilayer disk playback apparatus according to the invention.

In this way, the focus servo acts on the second recording layer stably after the focus jump. This assures that data can be read from the second recording layer. The above description is provided in further detail by referring to the waveform diagram illustrating changes in the focus error voltage signals shown in FIGS. 6, 8A, and 8B. It is assumed that at timing A shown in FIG. 8A, the focus is made to jump from the first recording layer to the second recording layer at the timing A. A control signal is fed from a system controller incorporated in a playback apparatus (not shown) to the selector 16-3, thus producing the neutral reference focus balancing voltage, using the variable resistor Rb. Then, the CPU 24 causes the focus ON signal e to drop, so that the switch 18 permits the focus search driver circuit 19 to produce the focus search drive signal. In this manner, the objective lens in the pickup moves. The selector 16-3 produces a focus error voltage as shown in FIG. 8A. The focus passes over the first layer, and the second layer is gradually focused. When the amplitude of the RF playback signal created by the detector 11 in response to the received light exceeds the reference voltage V1, the comparator 21 produces the focus OK signal b, thus turning on the switch 23. When the trailing edge of the zero-crossing detection signal supplied from the comparator 22 to the CPU 24 is detected, the CPU 24 supplies the focus ON signal e so as to turn it on. The switch 18 passes the focus error signal c produced from the phase-compensating circuit 17. This timing is taken as timing B.

As a result, the focus servo acts. The selector 16-3 is controlled by a control signal so as to select the output, using the variable resistor Rc. Consequently, the selector 16-3 produces the focus balancing voltage best suited for the second recording layer at timing C at which the focus servo system stabilizes.

Accordingly, the focus servo stably acts on the second recording layer. This assures that data can be read from the second recording layer.

Figure 8B:
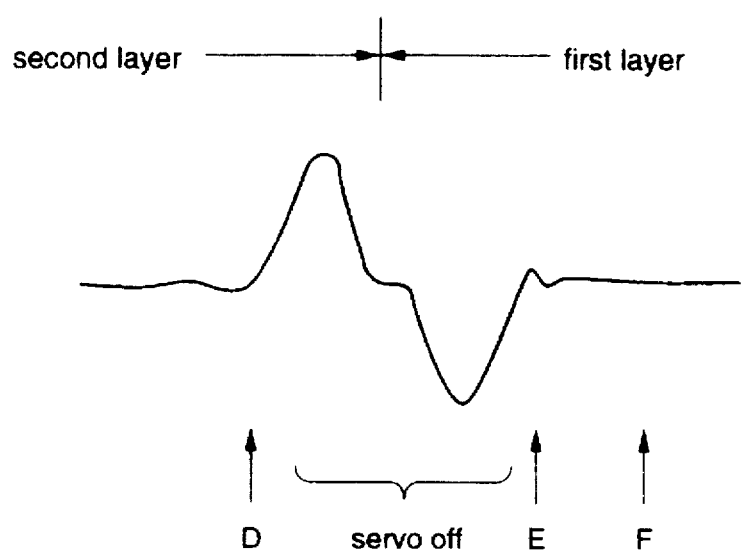

FIG. 8B shows variations of the focus error voltage signal where the focus is made to jump from the second recording layer to the first recording layer. In this case, at timing D, i.e., immediately before the jump of the focus, the focus balancing voltage in a neutral state is produced, using the variable resistor Rb. Then, the CPU 24 causes the focus ON signal e to drop, thus permitting the switch 18 to pass the focus search drive signal delivered from the focus search driver circuit 19. As a consequence, the objective lens in the pickup moves. The focus error voltage which is directed toward the first recording layer as shown in FIG. 8B is delivered from the selector 16-3. In this case, the level of the focus error voltage changes in the positive direction and then varies in the negative direction while approaching the first layer, unlike the above-described case.

The focus passes over the second layer, and the first layer is gradually focused. When the amplitude of the RF playback signal created by the detector 11 in response to the incoming light exceeds the reference voltage V1, the comparator 21 produces the focus OK signal b, thus turning on the switch 23. When the trailing edge of the zero-crossing detection signal supplied from the comparator 22 to the CPU 24 is detected, the CPU 24 supplies the focus ON signal e to the switch 18 so as to control it. The switch 18 passes the focus error signal c produced from the phase-compensating circuit 17. This timing is taken as timing E.

This permits application of the focus servo. The selector 16-3 is controlled by a control signal so as to select the output produced, using the variable resistor Ra. Consequently, the selector 16-3 produces the focus balancing voltage best suited for the first recording layer at timing F at which the focus servo system is settled.

Accordingly, the focus servo stably acts on the first recording layer. This assures that data can be read from the first recording layer.

With respect to the focus balancing voltage which is in a neutral state, the positive peak and the negative peak of the focus error voltage characteristic are ideally equal to each other. If the amount of error produced is about ±1 to 2 µm when converted into a distance traveled by the focus, then no problem arises.

In the description provided thus far, the focus balance-setting circuit 16-2 is built, using the variable resistors for the recording layers and the variable resistor producing a focus balancing voltage which is in a neutral state. The present invention is not limited to this structure. Each variable resistor may be constructed from an electronic volume. Furthermore, the focus balance-setting circuit 16-2 may be composed of one electronic volume, and the focus balancing voltage produced as described above may be varied at given timing. In this case, the selector 16-3 can be omitted.

Since the present invention is constructed as described thus far, even if the focus is made to jump from one recording layer of a multilayer disk to another, the focus servo can be applied stably after the jump of the focus. This assures that data can be read from the recording layer after the jump of the focus. In addition, the structure used for this purpose can be simplified.

What is claimed is:

1. A method of playing back an optical multilayer disk having a plurality of recording layers stacked on top of each other by the use of an optical pickup device having a focus balancing setting and a focal point, said method comprising the steps of:

switching said focus balancing setting of said optical pickup device from a setting providing a focus error detection characteristic adapted for a first one of said recording layers to a reference setting that provides a neutral focus error detection characteristic;

moving the focal point of said optical pickup device out of said first recording layer onto which said optical pickup device is focused;

focusing said optical pickup device onto a second one of said recording layers to read data from the second recording layer;

then switching said focus balancing setting of said optical pickup device to a setting adapted for said second recording layer, whereby a recording layer read by said optical pickup device is switched from said first recording layer to said second recording layer.

2. The method of claim 1, wherein said step of switching said focus balancing setting of said optical pickup device to the setting adapted for said second recording layer involves the step of comparing the data read from the second recording layer with a reference level, and wherein said focus balancing setting of said optical pickup device is switched to the setting adapted for said second recording layer after the read data has exceeded the reference level.

3. The method of claim 1, wherein said step of moving the focal point of said optical pickup device from said first recording layer onto which said optical pickup device is focused consists of setting said focus balancing setting of said optical pickup device to said reference setting that provides the neutral focus error detection characteristic so that said first and second recording layers can be selectively read out.

4. An apparatus for playing back an optical multilayer disk having a plurality of recording layers stacked on top of each other, said apparatus comprising:

an objective lens for directing laser light at any one of the recording layers of said optical disk;

a signal detection means for receiving light reflected from said optical disk and for detecting signals recorded in said optical disk;

a focus detection means for producing a focus error signal indicating an error in focusing said laser light;

a driving means for driving said objective lens in a direction to focus said lens in order to focus said laser light onto a desired one of said recording layers;

a focus balance-setting means for setting a focus balanced condition according to a characteristic of the error detected by said focus detection means and for switching said focus balanced condition between (i) a reference setting for bringing at least a focus error characteristic into a neutral state, (ii) a setting adapted for a first one of the recording layers, and (iii) a setting adapted for a second one of the recording layers; and a focusing detection means for sensing whether the laser light is focused onto the desired recording layer from an output signal from said focus balance-setting means.

5. The apparatus of claim 4, wherein said focus balance-setting means is so controlled as to go through said reference setting while a focus of said laser light is being shifted from said first recording layer to the second recording layer.

6. The apparatus of claim 4, wherein said focus balance-setting means comprises:

a plurality of focus-balancing circuits for producing focus-balancing output signals adapted for said recording layers, respectively, of said optical multilayer disk;

a reference focus-balancing circuit for producing a reference focus-balancing output signal according to the focus error signal from said focus detection means to produce a reference focus-balancing output signal providing a neutral error voltage characteristic; and a selecting circuit for selecting and enabling one of said focus-balancing circuits.

7. The apparatus of claim 4, wherein said focus balance-setting means includes an electronic volume circuit for producing focus-balancing output signals adapted for the recording layers, respectively, of said optical disk.

8. The apparatus of claim 4, wherein said focusing detection means compares the output signals from said focus-balancing circuits with a reference level and senses whether the laser light is focused.

9. The apparatus of claim 4, wherein said focus detection means includes an optical detector split into four parts which produce their respective output signals in response to incident light, and wherein said focus detection means detects an error in focusing said laser light.

10. The apparatus of claim 4, wherein said signal detection means produces a signal containing data about subcodes, and wherein said signal detection means detects a number given to a recording layer that is presently being read.

11. An apparatus for playing back an optical multilayer disk having a plurality of recording layers stacked on top of each other, said apparatus comprising:

an optical pickup device for focusing light onto any one of said recording layers and for reading data from the focused recording layer;

a focus balance-setting means for setting a focus balanced condition of said optical pickup device; and wherein when data is read from other recording layer by causing the focus of said optical pickup to make a jump from one of the recording layers onto which said optical pickup device is focused so that said optical pickup device is focused onto said other recording layer, a focus balanced point of said optical pickup device is moved into a reference focus balanced point where error voltage characteristics of said pickup device are in a neutral state to make the focus jump and then the focus balanced point is set to a focus balanced point adapted for the other recording layer.

12. The apparatus of claim 11, wherein said optical pickup device comprises:

an objective lens for directing laser light at any one of the recording layers of said optical disk;

a signal detection means for receiving light reflected from said optical disk and for detecting signals recorded in said optical disk;

a focus detection means for producing a focus error signal indicating an error in focusing said laser light; and a driving means for driving said objective lens in a direction to focus said lens in order to focus said laser light onto a desired one of said recording layers.

13. The apparatus of claim 11, wherein said focus balance-setting means comprises:

a plurality of focus-balancing circuits for producing focus-balancing output signals adapted for said recording layers, respectively, of said optical disk;

a reference focus-balancing circuit for producing a reference focus-balancing output signal according to the focus error signal from said focus detection means to produce a neutral error voltage characteristic; and a selecting circuit for selecting and enabling one of said focus-balancing circuits.

* * * * *